Nov. 9, 1943.  W. J. MAYS  2,333,874
WORK TABLE
Filed Nov. 9, 1942

INVENTOR
WILLIAM J. MAYS
BY *Henry L. Jennings*
ATTORNEY

Patented Nov. 9, 1943

2,333,874

UNITED STATES PATENT OFFICE 2,333,874

WORKTABLE

William J. Mays, Birmingham, Ala.

Application November 9, 1942, Serial No. 465,065

3 Claims. (Cl. 51—216)

This invention relates to a work table for use in holding articles to be machined in a fixed relation to a machine tool, and has for an object the provision of a device of the character designated which shall be simple and sturdy of construction, easily manipulated, and adjustable to a multiplicity of positions.

A further object of my invention is to provide a work table of the character described which shall include upper and lower plane surfaced members and an intermediate connector with adjustable ball and socket joints between both of said plane surfaced members and the connector.

A still further object of my invention is to provide a table of the character described including improved ball and socket joints with a rigid connector between them, said connector being so constructed as to provide an additional bearing against the sides of the ball and socket joints to furnish steadier support for the work than would otherwise be obtainable.

Still another object of my invention is to provide a device of the character described with a work supporting member so shaped as to permit a wide angular adjustment, coupled with sturdiness in all positions, and means to set articles to be machined expeditiously at the proper angles.

Briefly, my invention comprises upper and lower plates which may be identical in size and shape, and which are made preferably with two rectilinear sides at right angles to each other, and a third side the segment of a circle, the straight sides being nearer the center from which the circular side is struck than is the circular side. The upper and lower plates are each provided with a ball and socket joint, together with suitable clamping means to hold it in adjusted position, and a connector between the ball and socket joints whereby the upper and lower plates may be adjusted to any desired angle with relation to each other. The ball and socket joints are rigidly supported from the plates and the device is extremely steady in any adjusted position. Further means are provided so that in extreme adjusted positions the connector is afforded an additional bearing against the sides of the ball and socket joints, thus providing additional sturdiness of support.

Figure 1:
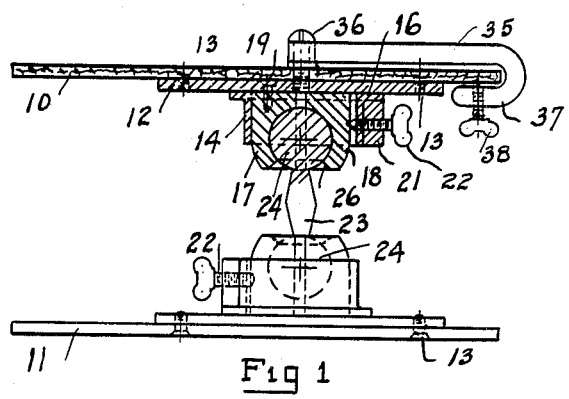
Figure 2:
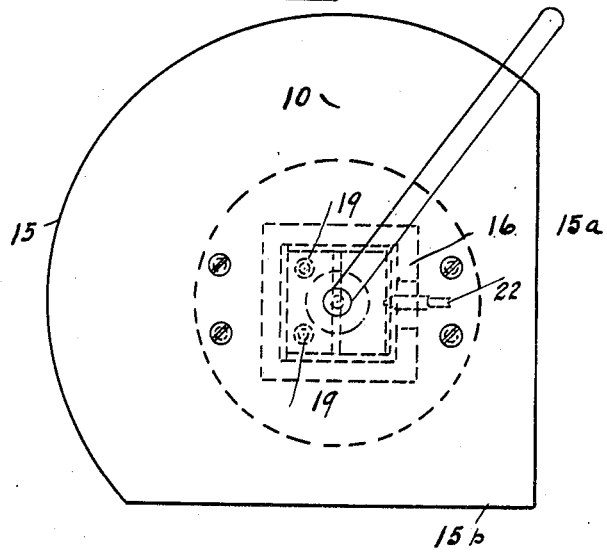

A device embodying features of my invention is illustrated in the accompanying drawing forming a part of this application, in which Fig. 1 is an elevational view partially in section;
Fig. 2 is a plan view; and Fig. 3 is a diagrammatic view illustrating one of the uses of my invention with a machine tool.

Referring to the drawing for a better understanding of my invention, I show an upper plate 10 and a lower plate 11 which plates may be made of any suitable material and be of such dimensions as to provide solid support of the work to be done. In using my device in the cutting and shaping of bricks, I have found that a base of around eighteen inches across is sufficiently large. The construction of both plates 10 and 11 being identical and the connections being identical, a description of one will suffice for both. As will be seen in Fig. 2, one side 15 of the plate 10 is in the form of a segment of a circle; while two sides 15a and 15b are rectilinear and closer to the center from which the segmental side 15 is struck. The purpose of this construction is to permit a wider range of adjustment of the position of the top 10 and a steadier rest for certain kinds of work. On the underside of the plate 10 is a base 12, secured to the plate by means of screws 13, which base functions to reinforce the plate and provides a foundation for the ball and socket joint. Secured to the base 12 is a housing 14 having a base flange 16, which may be welded to the base 12. Fitting into the housing 14 with a relatively loose fit are the halves 17 and 18 of a spherical socket, the half 17 being secured to the base 12 by means of screws 19. On the other side of the housing 14 from the fixed half 17 is a threaded boss 21 through which extends a set screw 22 to engage the unattached socket member 18 and by which the socket members may be tightened.

Between the adjustable sockets just described is a connector 23 having a ball 24 on each end fitting into the sockets. It will be seen that the sockets, when tightened down on the balls 24 by means of the set screws 22, will hold the upper and lower plates in any desired relative positions.

Figure 3:
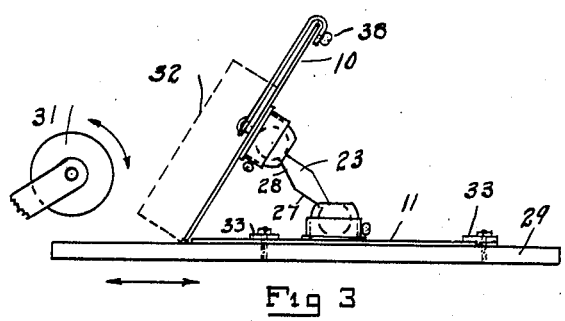

In order to provide additional steadiness of rest in extreme adjusted positions, I provide the socket members 17 and 18 with outwardly flaring sides 26 and flare the sides of the connector 23 as shown at 27 and 28 toward the middle point between the two balls 24 so that said flaring sides may take an additional bearing against the flaring sides 26 of the sockets when the plates 10 and 11 are in extreme angularly adjusted positions as shown in Fig. 3.

In certain operations, such as in connection with a power saw, it is often necessary to cut or machine a plurality of similar articles at the same angle. In order to accomplish such an operation, I mount an adjustable arm 35 on a central pivot screw 36, so that it may swing about the circular edge 15 of the upper plate 10. A lip 37 extends under the edge of the plate 10, and a set screw 38 extending through the lip is adapted to engage the upper plate 10 and hold the arm in adjusted position.

Referring now to Fig. 3 I show my improved device mounted on a bed 29 which is adapted to reciprocate as indicated by the arrow beneath it and feed work to a swinging saw indicated by the number 31. The device is shown in adjusted position and supporting an object 32 to be cut which object is resting against the upper plate 10. As the bed 29 reciprocates, the work is brought into engagement with the saw 31 and the object may be cut to any desired angle. Also, if desired, the lower plate 11 may be clamped to the bed 29 as by means of the usual clamps 33. If it is desired to cut a plurality of similar articles at the same angle, the adjustable arm 35 is set at the required angle, the articles to be cut are brought successively against the adjustable arm and cut successively at the same angles. The adjustable arm thus forms a straight edge for setting articles to be worked on. The rectilinear sides of the plates 10 and 11 permit a wider angular adjustment of the plates with respect to the bed 29 and to each other, and are especially adapted for use where one edge of an article to be worked on is to be held flat on the bed of the machine, at some predetermined angle. This is of particular utility where articles are to be brought evenly against the side of a sanding wheel.

From the foregoing it will be apparent that I have devised an improved work table which is adapted to act as a steady rest in connection with cutting and grinding machine tools, particularly in the cutting and shaping of bricks, which is simple of design, easy to manufacture, and sturdy and reliable in operation.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a work table, upper and lower plates, split ball socket members associated with each of said plates, means to secure one of each of said socket members to its associated plate the other being unattached, a housing for each of the socket members, a set screw extending through the housing and bearing against the unattached socket member, a connector between the plates, and a ball on each end of the connector fitting into the corresponding socket.

2. In a work table, upper and lower plates, split ball socket members associated with each of said plates, means to secure one of each of said socket members to its associated plate the other being unattached, a housing for the socket members, a set screw extending through the housing and bearing against the unattached socket member, said socket members having outwardly flaring openings, a connector between the plates having a shank with flaring sides to take a bearing against the outwardly flaring sides of the socket members when in extreme angularly adjusted positions, and a ball on each end of the connector fitting into the corresponding socket.

3. In a work table, upper and lower plates, split ball socket members associated with each of said plates, means to secure one of each of said socket members to its associated plate the other being unattached, a housing for the socket members, a set screw extending through the housing and bearing against the unattached socket member, said socket members having outwardly flaring openings, a connector between the plates having a shank with flaring sides to take a bearing against the outwardly flaring sides of the socket members when in extreme angularly adjusted positions, a ball on each end of the connector fitting into the corresponding socket, and an angularly adjustable arm on the upper plate for adjustable positioning articles on the work table.

WILLIAM J. MAYS.